UNITED STATES PATENT OFFICE 2,273,556

AROMATIC ESTERS AND THE MANUFACTURE THEREOF

Frederic R. Bean, Rochester, N. Y., assignor to Eastman Kodak Company, Rochester, N. Y., a corporation of New Jersey No Drawing. Application July 1, 1938, Serial No. 217,023

10 Claims. (Cl. 260—471)

This invention relates to the manufacture of aromatic esters, the ester compositions, and the use of the novel esters. More particularly, my invention relates to the manufacture of an amino type ester such as propyl or amyl p-hydroxyphenylamino acetate.

While a large number of aromatic esters are known and methods for their production have been disclosed, I am not aware that my novel esters have heretofore been produced. I have found that aromatic esters may be produced in accordance with my methods and that these esters may be employed for use in the art where previously acidic compounds and other type aromatic derivative had been employed.

This invention has for one object to provide a process for the manufacture of amino esters. Another object of this invention is to provide a process for the manufacture of amino esters containing a 3–5 carbon atom radical, such as propyl or butyl, in the molecule. A still further object is to provide a catalytic process for producing amino esters wherein relatively high yields may be obtained. Another object is to produce a novel ester of the structure comprising an ester group attached to a nitrogen atom also having a phenol group and hydrogen there attached. Still another object is to prepare novel aromatic amino esters which are only slightly soluble in water but which are quite soluble in other liquids such as, for example, hydrocarbons. A still further object is to provide aromatic esters which may be employed for reducing agents and for other uses where reducing activity is required. A still further object is to produce the esters, propyl-p-hydroxyphenylaminoacetate and secondary amyl-p-hydroxyphenylaminoacetate. Other objects will appear hereinafter.

I have found a method whereby aromatic amino esters may be produced by catalytic reaction at temperatures not materially greater than the temperature of a steam bath and in the event a reduced pressure or other expedients were employed, lower or modified temperature conditions could also be employed. For a more complete understanding of my invention, reference is made to the following examples, which represents procedure employed for producing one of the preferred esters. It is understood that the values set forth in this example are primarily for the purpose of illustrating my preferred embodiments and hence my invention is not to be restricted entirely thereto.

20 gr. of p-hydroxyphenylamino acetic acid were mixed with 250 cc. of secondary amyl alcohol. p-hydroxyphenylaminoacetic acid is a compound comprising the formula:

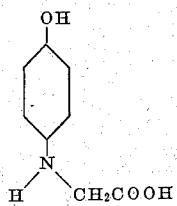

and may be obtained from any of the usual sources for use in the present invention. For example, the aforementioned aminoacetic acid may be obtained by reacting p-aminophenol with chloracetic acid. Or, methods disclosed in the literature may be employed. The alcohols employed are well-known commercial quantities and hence further description is unnecessary. This mixture of the amino acid and alcohol was saturated with hydrogen chloride gas and then warmed on a steam bath under reflux for between 6 and 15 hours. The unreacted alcohol was then distilled off leaving the ester hydrochloride as a residue. This residue was then poured into two liters of cold water containing about $\frac{1}{16}$ mole of sodium carbonate. This step was accompanied by vigorous agitation of the components. The end point was then adjusted until it was neutral to brilliant yellow. Thereafter the ester was filtered off, washed and dried. The yield in this particular example was approximately 70% of an ester (secondary amyl p-hydroxyphenylamino acetate) melting at approximately 51° C.

Another run similar to that described was carried out except that propyl alcohol was employed as the alcohol. In this run propyl p-hydroxyphenylaminoacetate was obtained in substantial yields, this ester having a melting point of approximately 81° C.

Similar procedure may be applied to react p-hydroxyphenylaminoacetic acid and other alcohols. It is, of course, understood with respect to such reactions suitable temperature changes would be made to compensate for the different boiling points of the alcohols employed and distilling them from the reaction mixture. It is also possible to employ other alkalis than sodium carbonate. For example, potassium carbonate, calcium hydroxide and carbonate, sodium acetate and the like, may be utilized. It is also possible to modify my process in certain other respects. For example sulfuric acid, phosphoric acids, zinc chloride or other salts, or other suitable esterification catalysts may be employed. Certain of the alcohols employed will carry off the esterification water as an azeotrope.

The esters produced according to my invention may be described as comprising an aliphatic ester group attached to a nitrogen atom which also has attached thereto a hydrogen atom and a phenol group. For example, one of my preferred esters comprises the structural formula R₁NHR, where R may represent a substituted or unsubstituted aromatic group such as phenol. The symbol R₁ refers to an ester, for example, such as CH₂COOPr where Pr represents propyl or CH₂COOAm wherein Am represents either the normal or secondary amyl radical.

The esters described herein may be employed as reducing agents and for other purposes such as described in Patents 2,122,408 and 2,122,409, in which I am one of the patentees.

Some of the purposes for which my esters may be employed are antioxidants or inhibitors in rubber and resins, as the various synthetic resins obtained by polymerization or the like. The ester may also be utilized in various oils such as vegetable oils. Or, the esters may be used in photographic developers or for other photographic purposes.

It is apparent from the preceding that my invention is susceptible of some modification, hence, I do not wish to be restricted, excepting insofar as is necessitated by the prior art and the spirit of the appended claims.

What I claim and desire to secure by Letters Patent of the United States of America is:

1. A process for the manufacture of esters, which comprises forming a mixture of an organic acid of the formula HOOC—CH₂—NHR, where R represents a p-hydroxyphenyl group, with an excess of an aliphatic alcohol having 3–5 carbon atoms, saturating this mixture with hydrogen chloride gas, warming the mixture for 4–20 hours at a temperature such as obtains in a steam bath, removing at least a portion of the unreacted alcohol, precipitating the ester hydrochloride in an aqueous alkaline solution and recovering the aromatic ester from the solution.

2. A process for the manufacture of esters, which comprises forming a mixture of an organic acid of the formula HOOC—CH₂—NHR, where R represents a p-hydroxyphenyl group, with propyl alcohol incorporating an esterification catalyst which will give the ester salt, with the mixture, warming the mixture for several hours at a temperature such as obtains in a steam bath, removing at least a portion of the unreacted alcohol, precipitating the ester salt in an aqueous alkaline solution and recovering the propyl p-hydroxyphenylaminoacetate.

3. A process for the manufacture of esters, which comprises forming a mixture of an organic acid of the formula HOOC—CH₂—NHR, where R represents a p-hydroxyphenyl group, with an amyl alcohol, incorporating an acid catalyst with this mixture, warming the mixture at a temperature and for a time, until esterification takes place, removing at least a portion of the unreacted alcohol, precipitating the ester salt in an aqueous alkaline solution and recovering an amyl p-hydroxyphenylamino acetate.

4. A mono-alkyl ester of p-hydroxyphenylamino acetic acid, in which the alkyl group has at least 3 and not more than 5 carbon atoms.

5. A process for the manufacture of hydroxyphenylglycine esters, which comprises reacting a hydroxyphenylamino acetic acid with a lower aliphatic alcohol having at least 3 atoms in the molecule, in the presence of an esterification catalyst, to produce a salt of said ester, and treating the salt to liberate the ester therefrom.

6. An ester having the structural formula R'NHR, where R represents a hydroxy phenyl group and R' refers to an ester from the group consisting of CH₂—COO—butyl and CH₂—COO—amyl.

7. A propyl ester of p-hydroxyphenylaminoacetic acid.

8. An amyl ester of p-hydroxyphenylaminoacetic acid.

9. A secondary amyl ester of p-hydroxyphenylaminoacetic acid.

10. A process for the manufacture of lower monoalkyl esters of a hydroxy phenyl amino substituted acetic acid which comprises reacting said amino acid with a lower aliphatic alcohol having at least three carbon atoms in the molecule, in the presence of an acidic esterification catalyst, and at a temperature not materially exceeding 200° C. to produce an acid salt of said ester, neutralizing the acid salt and recovering the ester therefrom.

FREDERIC R. BEAN.